US012723624B2

(12) United States Patent
Kim et al.

(10) Patent No.: US 12,723,624 B2
(45) Date of Patent: Sep. 1, 2026

(54) BEARING ASSEMBLY FOR VEHICLE

(71) Applicants: HYUNDAI MOTOR COMPANY, Seoul (KR); KIA CORPORATION, Seoul (KR); HYUNDAI TRANSYS INC., Seosan-si (KR); ECOPLASTIC CORPORATION, Gyeongju-si (KR)

(72) Inventors: Cheon Ho Kim, Hwaseong-si (KR); Byung Yong Choi, Hwaseong-si (KR); Jung Yoon Jang, Hwaseong-si (KR); Byoung Wook Kim, Hwaseong-si (KR); In Gul Baek, Yongin-si (KR); Yong Seong Jang, Gunpo-si (KR); Chan Ju Kim, Gunpo-si (KR); Song Hee Bae, Hwaseong-si (KR); Dong Jin Park, Daegu (KR); Jong Heon Lee, Suwon-si (KR); Hae Ju Park, Gyeongju-si (KR)

(73) Assignees: HYUNDAI MOTOR COMPANY, Seoul (KR); KIA CORPORATION, Seoul (KR); HYUNDAI TRANSYS INC., Seosan-si (KR); ECOPLASTIC CORPORATION, Gyeongju-si (KR)

( * ) Notice: Subject to any disclaimer, the term of this patent is extended or adjusted under 35 U.S.C. 154(b) by 30 days.

(21) Appl. No.: 18/926,036

(22) Filed: Oct. 24, 2024

(65) Prior Publication Data

US 2025/0347318 A1 Nov. 13, 2025

(30) Foreign Application Priority Data

May 9, 2024 (KR) ........................ 10-2024-0061110

(51) Int. Cl.

*F16C 29/02* (2006.01)
*B60N 2/75* (2018.01)
*B60N 3/00* (2006.01)

(52) U.S. Cl.

CPC .............. *F16C 29/02* (2013.01); *B60N 2/773* (2018.02); *B60N 3/001* (2013.01); *F16C 2314/70* (2013.01)

(58) Field of Classification Search

CPC .... F16C 29/002; F16C 29/02; F16C 2314/00; F16C 2314/70; B60N 2/773; B60N 3/001; A47B 88/483; A47B 2210/0029

See application file for complete search history.

(56) References Cited

U.S. PATENT DOCUMENTS

2024/0384582 A1* 11/2024 Kim ........................ F16C 29/02

FOREIGN PATENT DOCUMENTS

JP 4743812 B2 * 8/2011
KR 2004-0098364 A 11/2004

OTHER PUBLICATIONS

Machine Translation of JP-4743812-B2 (Year: 2011).*
U.S. Appl. No. 18/224,776, filed Jul. 21, 2023.

* cited by examiner

*Primary Examiner* — Alan B Waits
(74) *Attorney, Agent, or Firm* — MCDONNELL BOEHNEN HULBERT & BERGHOFF LLP

(57) ABSTRACT

A bearing assembly for a vehicle in a rail structure in which two rails slide by being rail-coupled to each other, wherein the two rails, either of which having a mounting area, include a first rail configured to slide along a second rail and the second rail, wherein the bearing assembly includes a spring glide mounted to the mounting area and configured to dampen vibration transmitted from either the first rail or the second rail, and a damper assembled to the internal surface of the spring guide and configured to prevent deformation of the spring glide.

15 Claims, 11 Drawing Sheets

BEARING ASSEMBLY FOR VEHICLE

CROSS REFERENCE TO RELATED APPLICATIONS

This application claims, under 35 U.S.C. § 119(a), the benefit of and priority to Korean Patent Application No. 10-2024-0061110, filed on May 9, 2024, the entire contents of which are incorporated herein by reference.

TECHNICAL FIELD

The present disclosure relates to a bearing assembly for a vehicle. More particularly, the present disclosure relates to a bearing assembly configured to allow a sliding movement of a cover member that opens and closes the top of a console body, wherein the bearing assembly includes a damper configured to complement the rigidity of a spring glide.

BACKGROUND

Generally, a vehicle console is a structure installed in a space between a driver's seat and a passenger seat in a vehicle interior, and is used as a storage for storing items used by a driver and a passenger.

In addition to be used for storing items, the vehicle console is also used for a driver to rest his arm to reduce fatigue due to a long time driving.

For said purposes, a general vehicle console has a shape of a box with an openable top, and includes a console body coupled to a floor surface between a driver's seat and a passenger seat, and a cover member hinged to one side of the top of the console body to cover the open top.

Here, the console body has the shape of a box with an openable top and has formed therein a storage space to store items.

The cover member is hinged to one side of the top of the console body and serves to open and close the open top of the console body. The cover member also serves as an armrest allowing the driver to comfortably rest his arm after covering the top of the console body.

Particularly, the cover member is mounted to be slidably movable on the console body to thereby be selectively slid depending on where the driver puts his arm.

However, in a bearing provided to allow a sliding movement of the cover member, a gap is inevitably created in assembling the bearing to a moving rail, and thus additional components may be included to compensate for the gap, which consequently results in problems such as an increase in number of assembly processes and number of components.

Moreover, due to the gap, vibration from a vehicle body is transmitted to the cover member through the console body and the moving rail and then is transmitted to the driver through the cover member, resulting in poor quality and deteriorating operation sensitivity.

So as to solve said problems, a spring glide was provided to reduce vibration that occurs in a vehicle body by mounting an elastic body having a protruding top and a protruding side to overlap with the moving rail to reduce a gap between the moving rail and a bearing.

However, the spring glide had a problem in that the spring was excessively pressed and deformed when an instantaneous and strong force was locally applied, and thus still not being able to reduce the vibration occurring in the vehicle body. For this reason, there is a need for an apparatus capable of providing a smooth operation sensitivity when sliding the console, enabling the console to be slid with a small operating force, adjusting the position of the spring to have high rigidity, and complementing spring force.

Moreover, the spring glide of the console of the prior art has a problem in that, when the dimensional difference between two rails is beyond a predetermined level, there needs an additional assembly process to plastically deform the spring to match the size of the rail.

The above information disclosed in this Background section is only for enhancement of understanding of the background of the present disclosure, and therefore it may contain information that does not form the prior art that is already known to a person of ordinary skill in the art.

SUMMARY

The present disclosure has been made in an effort to solve the above-described problems associated with the prior art, and an object of the present disclosure is to provide an apparatus in which a spring glide is not deformed even though the spring glide is mounted to a rail.

Another object of the present disclosure is to provide an apparatus in which a spring glide is assembled at a position enabling a console to slide with smooth operation sensitivity, small operating force and high rigidity and complementing spring force.

Still another object of the present disclosure is to provide an apparatus in which a spring does not need to be plastically deformed to match the size of a rail even when the dimensional difference between two rails is beyond a predetermined level.

The objects of the present disclosure are not limited to the foregoings, and other objects of the present disclosure not mentioned herein may be understood based on the following description, and may be understood more clearly through the embodiments of the present disclosure. In addition, the objects of the present disclosure may be realized by means and combinations thereof indicated in the claims.

So as to achieve said objects of the present disclosure, provided is a bearing assembly for a vehicle including following configurations.

In one aspect, the present disclosure provides a bearing assembly for a vehicle in a rail structure in which two rails slide by being rail-coupled to each other, wherein the two rails, either of which having a mounting area, include a first rail configured to slide along a second rail and the second rail, wherein the bearing assembly may include a spring glide mounted to the mounting area and configured to dampen vibration transmitted from either the first rail or the second rail, and a damper assembled to the internal surface of the spring guide and configured to prevent deformation of the spring glide.

In an embodiment, the damper may be made of an elastic material.

In another embodiment, the damper may include a main portion mounted to the mounting area, a side extension protruding from a side surface of the main portion, and a lower extension protruding from a lower end of the main portion.

In still another embodiment, the second rail may have formed therein at least one groove in the length-wise direction of the second rail, and the damper may be inserted into the groove.

In yet another embodiment, the spring glide may include a body portion mounted to the mounting area, a first shaped portion protruding from an upper surface of the body portion and brought into contact with the first rail to dampen vibration in a first direction transmitted to the body portion, and a second shaped portion protruding from a side surface of the body portion and brought into contact with the first rail to dampen vibration in a second direction transmitted to the body portion.

In still yet another embodiment, the body portion, including the first shaped portion and the second shaped portion, may have a surface brought into contact with the first rail and the surface may be coated with a lubricant.

In a further embodiment, the first shaped portion may be made of an elastic material and have an arch shape so as be selectively compressed when vibration occurs in a vertical direction.

In another further embodiment, the second shaped portion may be made of an elastic material and have an arch shape so as to be selectively compressed when vibration occurs in a lateral direction.

In still another further embodiment, the body portion may include mounting members selectively stretchable to correspond to the width of the mounting area, and a bottom member configured to support the bottom surface of the mounting area and brought into contact with the second rail.

In yet another further embodiment, the mounting members may have an elasticity, and may be selectively stretched outward to guide the body portion to press-fit to the mounting area.

In still yet another further embodiment, the mounting members may include locking members, respectively, which are bent from the body portion and protruding to face each other to correspond to the shape of the mounting area.

In a still further embodiment, the bottom member may include guide members inclined at the front and the rear thereof to release contact from the first rail in the length-wise direction.

In still another further embodiment, the bottom member may have formed therein a through hole configured to allow lubricant oil to move there through to the first rail, wherein the lubricant oil may be selectively discharged through the through hole to the contact surface between the bottom member and the first rail when the first rail slides with respect to the body portion.

In yet another still further embodiment, the body portion may include the first shaped portion integrated with an upper surface of the body portion and the second shaped portion integrated with a side surface of the body portion, and either one of or both of the first shaped portion and the second shaped portion may be coupled to the mounting area provided in the second rail in the length-wise direction.

In a yet still further embodiment, the rail structure may be any one of a seat rail, a table rail, and an armrest rail.

Other aspects and embodiments of the present disclosure are discussed infra.

It is to be understood that the term “vehicle” or “vehicular” or other similar terms as used herein are inclusive of motor vehicles in general, such as passenger automobiles including sport utility vehicles (SUV), buses, trucks, various commercial vehicles, watercraft including a variety of boats and ships, aircraft, and the like, and include hybrid vehicles, electric vehicles, plug-in hybrid electric vehicles, hydrogen-powered vehicles, and other alternative fuel vehicles (e.g., fuels derived from resources other than petroleum). As referred to herein, a hybrid vehicle is a vehicle that has two or more sources of power, for example, a vehicle powered by both gasoline and electricity.

BRIEF DESCRIPTION OF THE FIGURES

The above and other features of the present disclosure will now be described in detail with reference to predetermined exemplary embodiments thereof illustrated in the accompanying drawings which are given herein below by way of illustration only, and thus are not limitative of the present disclosure, and wherein.

Figure 1:
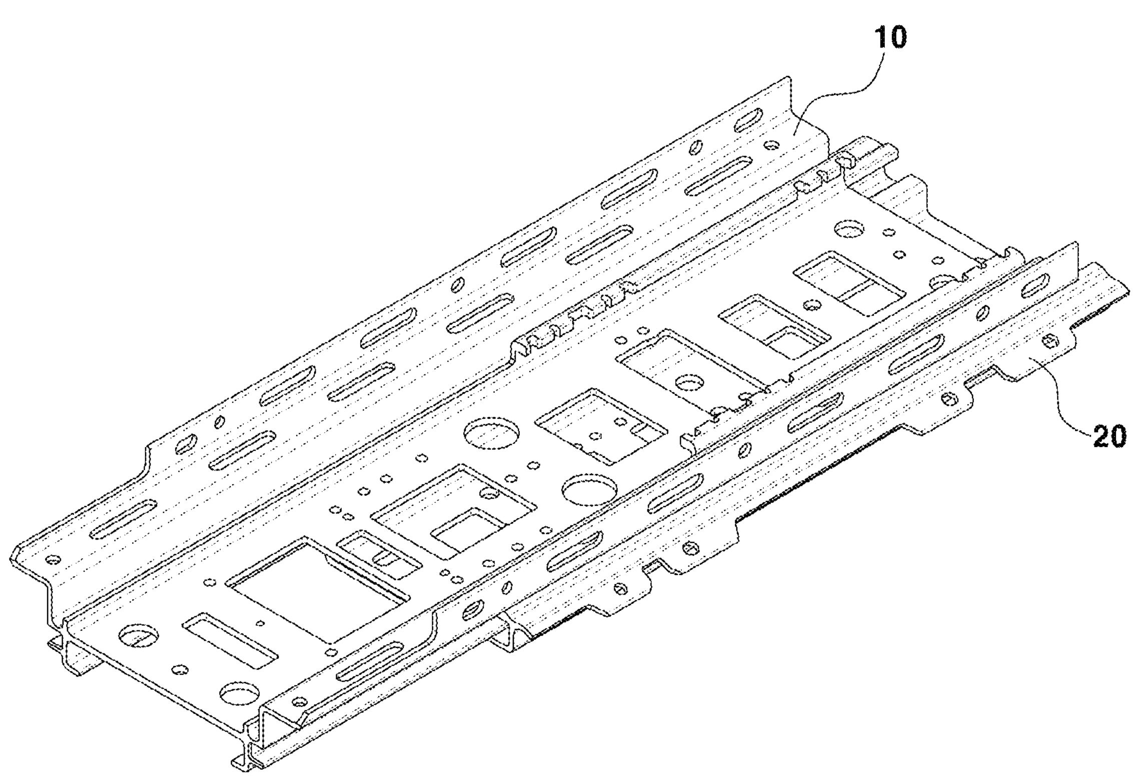
FIG. 1 is a view illustrating a structure in which a first rail and a second rail for a bearing assembly for a vehicle according to an embodiment of the present disclosure are coupled to each other.

It should be understood that the appended drawings are not necessarily to scale, presenting a somewhat simplified representation of various features illustrative of the basic principles of the present disclosure. The specific design features of the present disclosure, including, for example, specific dimensions, orientations, locations, and shapes, will be determined in part by the particular intended application and usage environment.

In the figures, the reference numbers refer to the same or equivalent parts of the present disclosure throughout the several figures of the drawing.

DETAILED DESCRIPTION

Hereinafter, embodiments of the present disclosure will be described with reference to the accompanying drawings. The matters described in the attached drawings may be different from those actually implemented in order to facilitate description of the embodiments of the present disclosure.

The terms “comprises” and/or “comprising” used in this specification mean that the cited component does not exclude the presence or addition of one or more of other components but may further comprise other components unless otherwise specified.

It will be understood that, when a component is referred to as being "connected to" or "brought into contact with" another component, the component may be directly connected to or brought into contact with the other component, or intervening components may also be present. In contrast, when a component is referred to as being "directly connected to" or "brought into direct contact with" another component, there is no intervening component present. Other terms used to describe relationships between components should be interpreted in a like fashion (e.g., "between" versus "directly between," "adjacent" versus "directly adjacent," etc.).

Hereinafter, an embodiment will be described in detail with reference to the accompanying drawings, and in the description given with reference to the accompanying drawings, the same or corresponding components are assigned the same reference numerals, and a description thereof will not be repeated.

Figure 2:
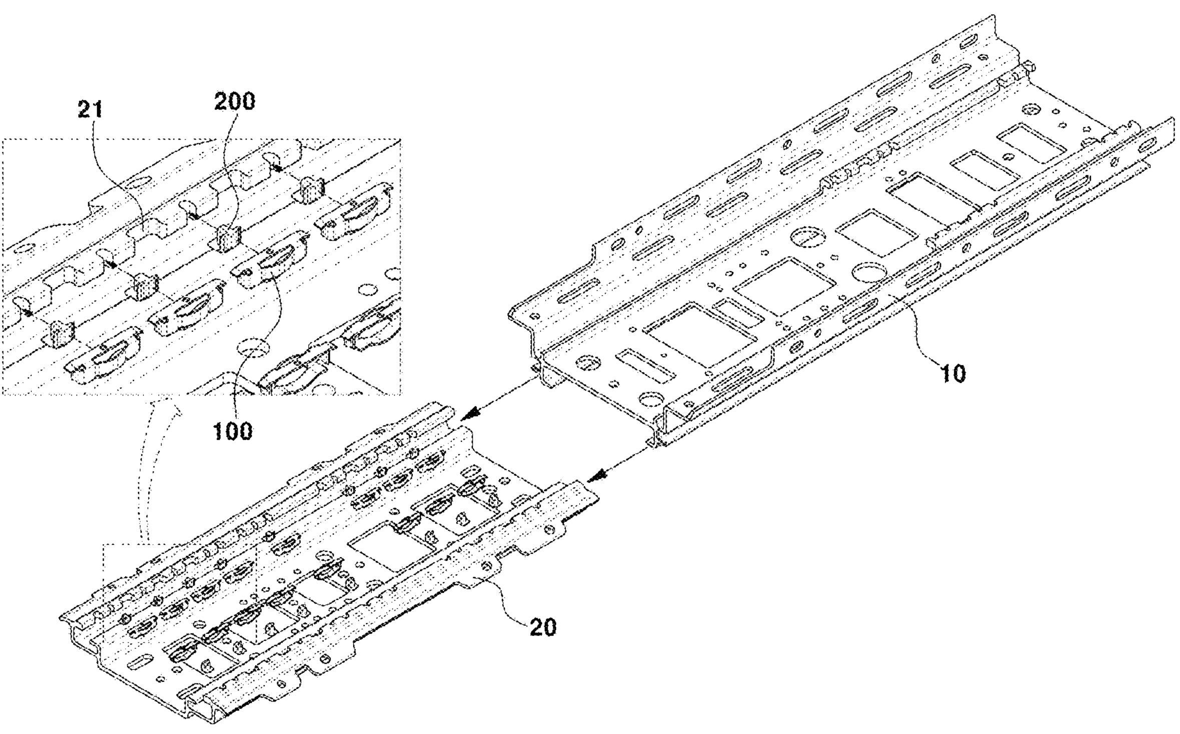
FIG. 2 is a view illustrating a structure before a spring glide and a damper of a bearing assembly for a vehicle according to an embodiment of the present disclosure are mounted to a groove in a second rail.
Figure 3:
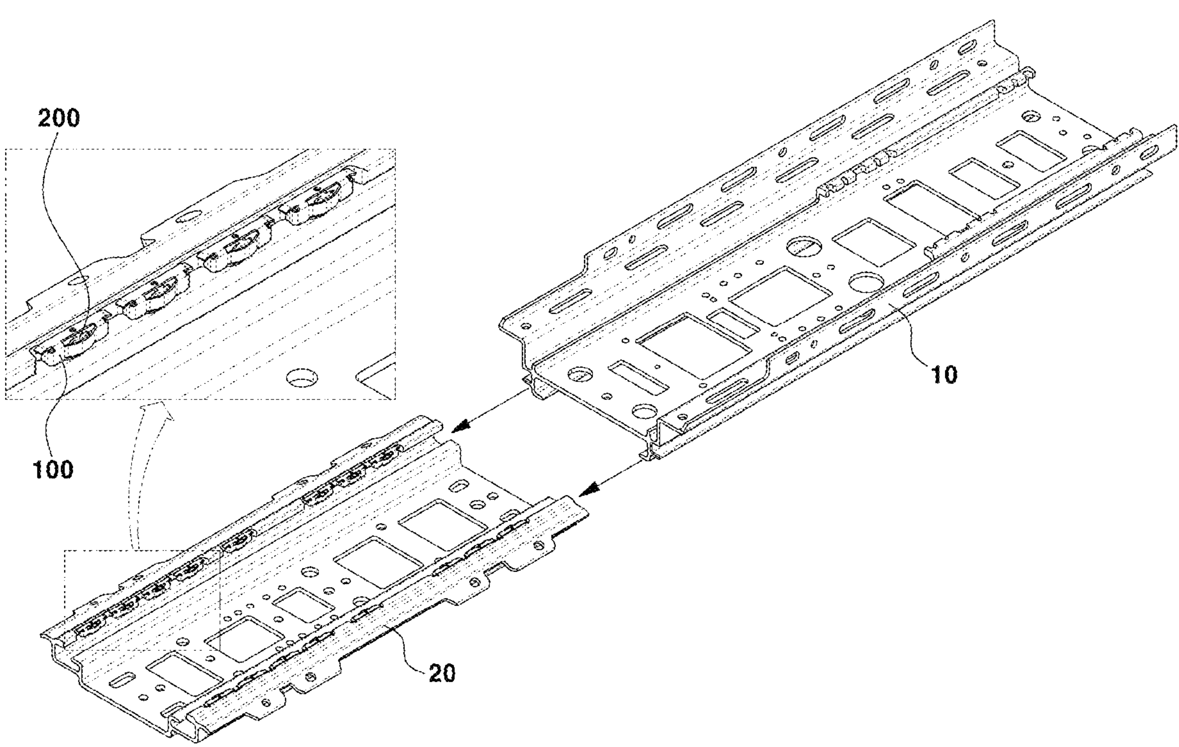
FIG. 3 is a view illustrating a structure in which a spring glide and a damper of a bearing assembly for a vehicle according to an embodiment of the present disclosure are mounted to a groove in a second rail.
Figure 4:
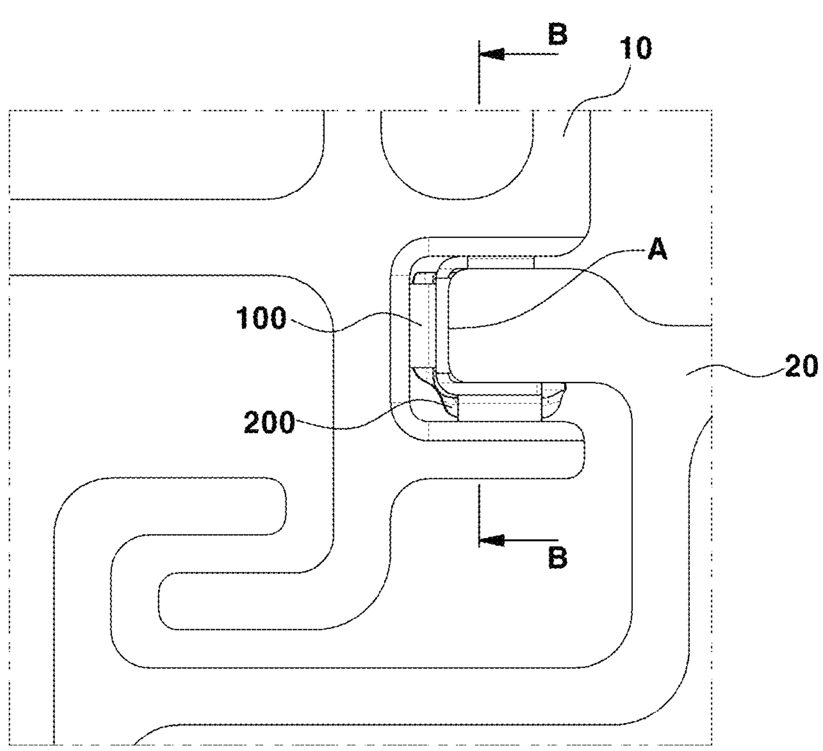
FIG. 4 is a cross-sectional view illustrating a structure in which a first rail, a second rail, a spring glide, and a damper of a bearing assembly for a vehicle according to an embodiment of the present disclosure are combined with one another.
Figure 5:
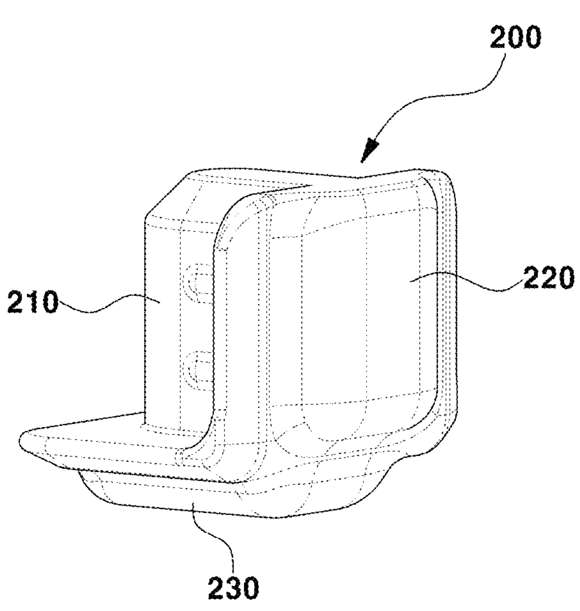
FIG. 5 is a view illustrating a damper of a bearing assembly for a vehicle according to an embodiment of the present disclosure.
Figure 6:
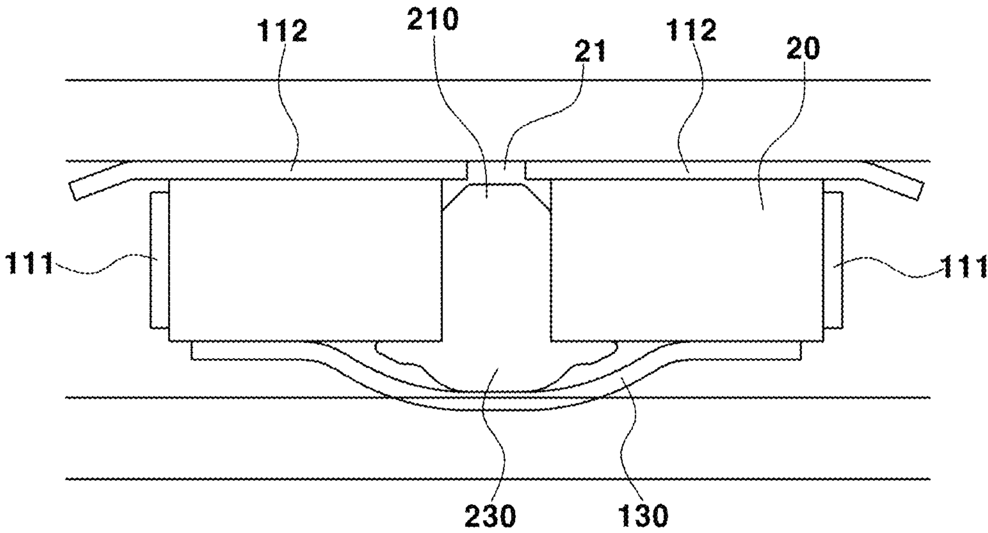
FIG. 6 is a cross-sectional view taken along line B-B in FIG. 4.
Figure 7:
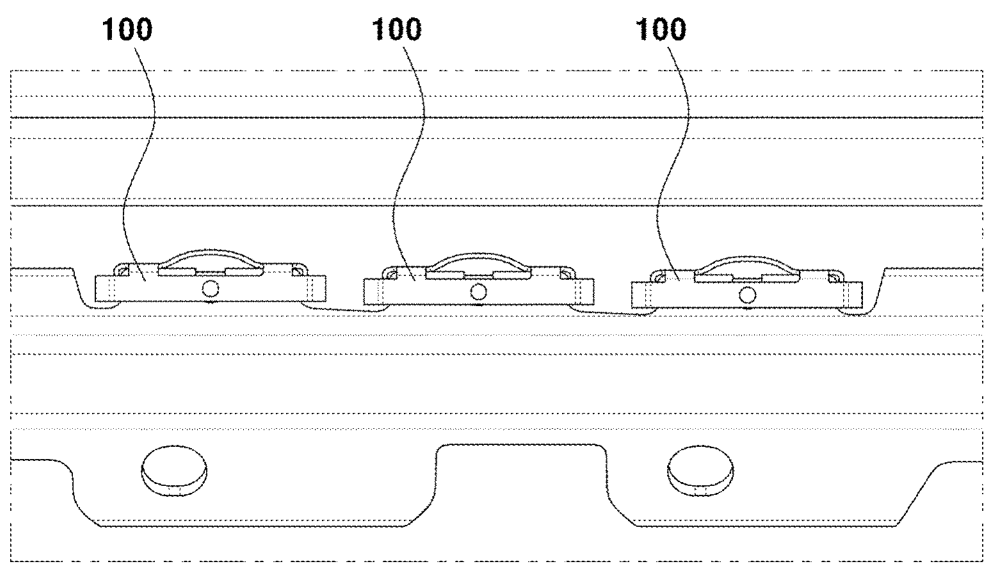
FIG. 7 is a view to explain various positions where a spring glide of a bearing assembly for a vehicle according to an embodiment of the present disclosure is assembled.
Figure 8:
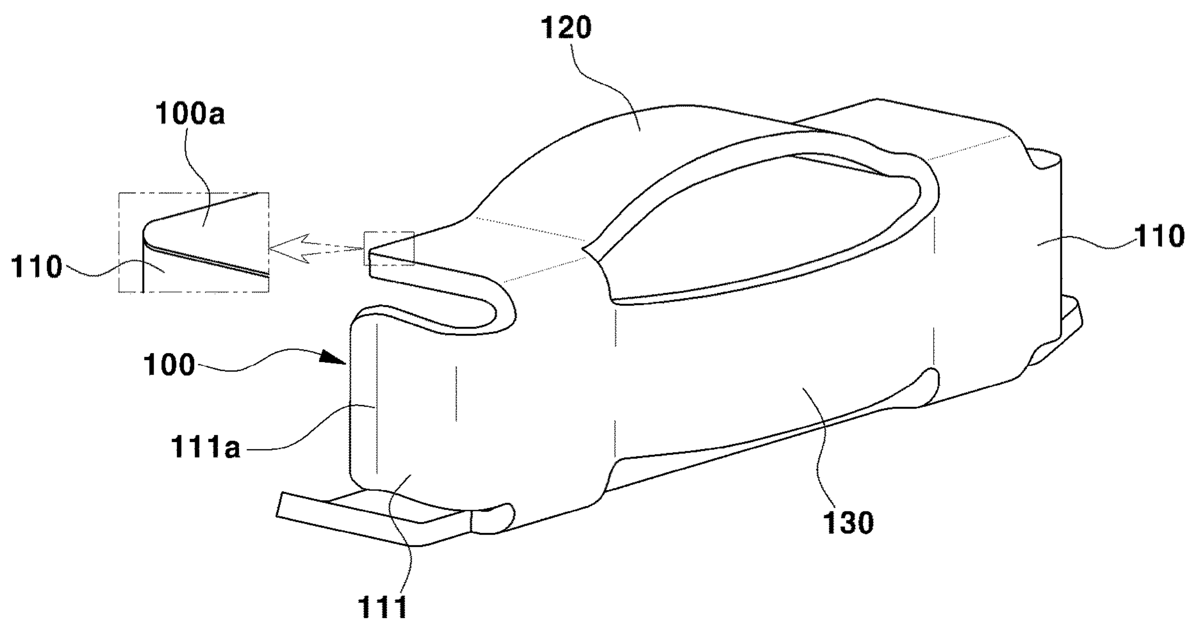
FIG. 8 is a view illustrating the external shape of a spring glide of a bearing assembly for a vehicle according to an embodiment of the present disclosure.
Figure 9:
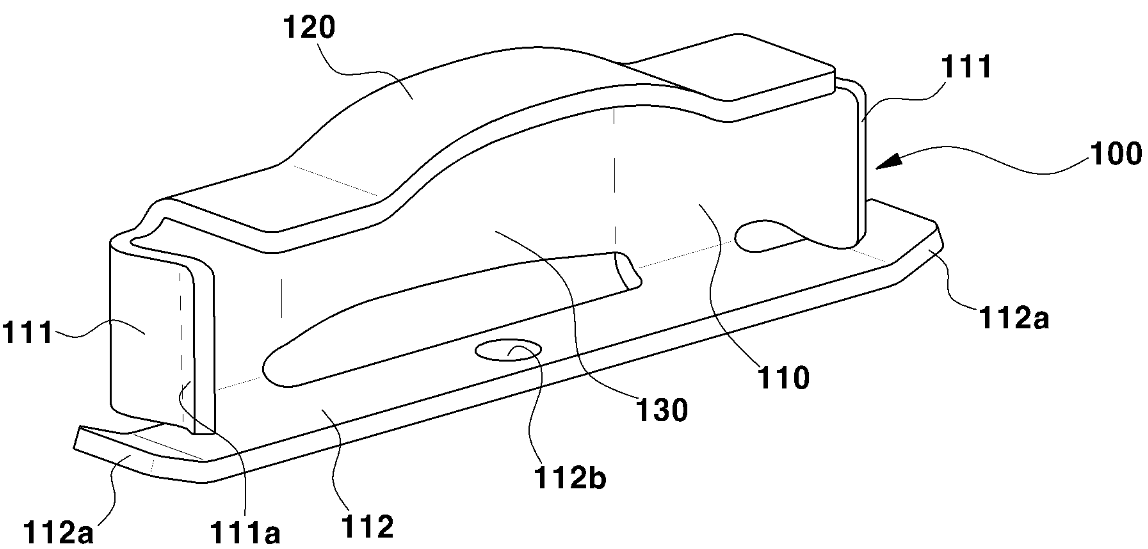
FIG. 9 is a view illustrating the internal shape of a spring glide of a bearing assembly for a vehicle according to an embodiment of the present disclosure.

FIG. 1 is a view illustrating a structure in which a first rail and a second rail for a bearing assembly for a vehicle according to an embodiment of the present disclosure are coupled to each other, FIG. 2 is a view illustrating a structure before a spring glide and a damper of a bearing assembly for a vehicle according to an embodiment of the present disclosure are mounted to a groove in a second rail, FIG. 3 is a view illustrating a structure in which a spring glide and a damper of a bearing assembly for a vehicle according to an embodiment of the present disclosure are mounted to a groove in a second rail, FIG. 4 is a cross-sectional view illustrating a structure in which a first rail, a second rail, a spring glide, and a damper of a bearing assembly for a vehicle according to an embodiment of the present disclosure are combined with one another, FIG. 5 is a view illustrating a damper of a bearing assembly for a vehicle according to an embodiment of the present disclosure, FIG. 6 is a cross-sectional view taken along line B-B in FIG. 4, FIG. 7 is a view to explain various positions where a spring glide of a bearing assembly for a vehicle according to an embodiment of the present disclosure is assembled, FIG. 8 is a view illustrating the external shape of a spring glide of a bearing assembly for a vehicle according to an embodiment of the present disclosure, FIG. 9 is a view illustrating the internal shape of a spring glide of a bearing assembly for a vehicle according to an embodiment of the present disclosure, and FIG. 10 shows views illustrating various embodiments in shape of a spring glide and a damper of a bearing assembly for a vehicle according to an embodiment of the present disclosure.

Although not illustrated in the drawing, a cover member, for example, that constitutes a general vehicle console serves as a cover to open and close the open top of a console body and also serves as an armrest where a driver may comfortably rest his arm when the top of the console body is closed. In order for the cover member to effectively serve as an armrest, the cover member must be slidable to correspond to the position of the driver's arm.

To this end, as illustrated in FIG. 1, the cover member may slide in a front-rear direction by, for example, a first rail 10, which is an upper rail, sliding in the length-wise direction of the other fixed rail, for example, a second rail 20, which is a lower rail, in a state in which a bearing assembly 1 is coupled to the first rail 10.

Figure 11:
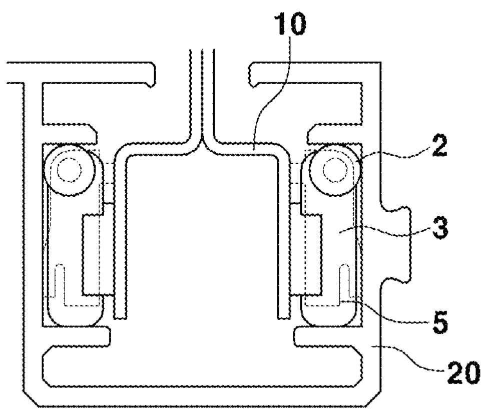
FIG. 11 and FIG. 12 are views illustrating a bearing assembly for a vehicle of the prior art.

In the case of a bearing assembly of the prior art, provided is, as illustrated in FIG. 11, a steel ball 2 that generates a rolling friction with a second rail 20, which is an aluminum extrusion rail or a steel pressed rail. However, because a gap is inevitably created between the steel ball 2 and the second rail 20 in a rolling operation and assembly process, when vibration occurs in a vehicle body, the vibration is transmitted to the cover member due to the gap and is eventually directed to the driver, deteriorating perceived quality.

Moreover, the gap created between the steel ball 2 and the second rail 20 may deteriorate operation sensitivity when sliding the cover member.

Figure 12:
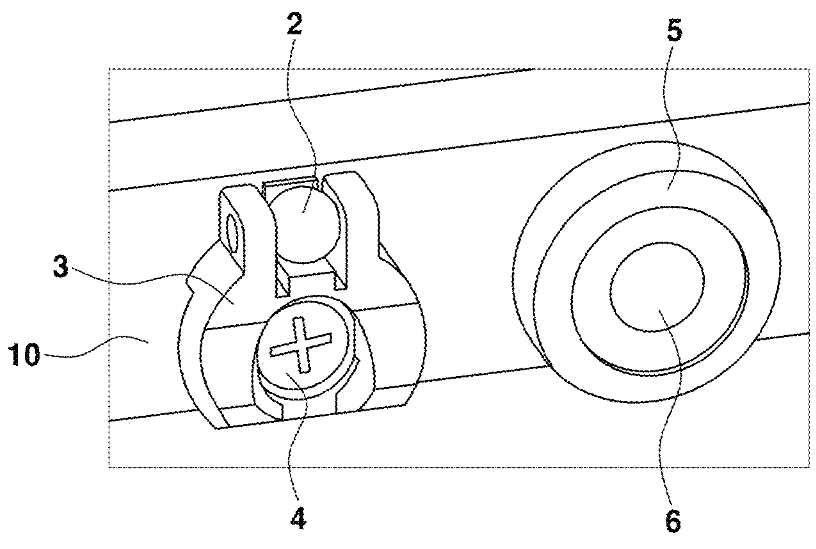

Furthermore, as illustrated in FIG. 12, in the bearing assembly of the prior art, a ball retainer 3 to which the steel ball 2 is mounted is assembled to a first rail 10 using a screw 4, a ball bearing 5 is mounted, and then the assembly process may be completed through riveting using a rivet 6.

However, a plurality of components, more specifically, the steel ball 2, the ball retainer 3, the screw 4, the ball bearing 5, the rivet 6, etc. must be combined with one another in the assembly process, increasing the number of components, and eventually, increasing the number of assembly process to combine the plurality of components.

So as to solve said problems, as illustrated in FIG. 2 through FIG. 4, a bearing assembly for a vehicle according to an embodiment of the present disclosure, in a rail structure in which two rails slide by being rail-coupled to each other, wherein the two rails, either of which having a mounting area, includes a first rail 10 configured to slide along a second rail 20 and the second rail 20, includes a spring glide 100 mounted to the mounting area A and configured to dampen vibration transmitted from either the first rail 10 or the second rail 20, and a damper 200 assembled to the internal surface of the spring guide 100 and configured to prevent deformation of the spring glide 100. Moreover, the second rail 20 of the present disclosure may have formed therein at least one groove in the length-wise direction, and the damper 200, to be described later, is inserted into the groove. Here, because the damper 200 has a main portion 210 fitted to be fixed in the groove in the second rail 20, the area of the groove may correspond to the area of the main portion 210 of the damper 200.

The spring glide 100 according to an embodiment of the present disclosure is mounted to a mounting area A provided in any one of the first rail 10 and the second rail 20, which slide by being coupled to each other. Moreover, the spring glide 100 of the present disclosure includes a body portion 110, a first shaped portion 120, and a second shaped portion 130.

The body portion 110 of the spring glide 100 of the present disclosure may be mounted to a mounting area A provided in either of the first rail 10, which is an upper rail, and the second rail 20, which is a lower rail, wherein the first rail 10 and the second rail 20 constitute a rail structure in which the pair of rails are coupled to each other. In this embodiment, the body portion 110 may be mounted to the second rail 20. However, the mounting position of the body portion 110 is not limited thereto. The body portion 110 may be mounted to a first rail 10 to which a cover member constituting a general console is slidably coupled or may be mounted to a first rail 10 coupled to a glovebox, which is used as a storage box and provided at a passenger side, and may also be adopted in any rail coupling structure in a vehicle configured to allow a sliding movement through rail coupling.

Furthermore, the present disclosure is not limited to be adopted in a console rail, but may be in various rail elements of a vehicle, such as a seat rail, a table rail, and an armrest rail.

Referring to FIG. 8 and FIG. 9, the body portion 110 of the spring glide 100 of the present disclosure includes the first shaped portion 120, the second shaped portion 130, mounting members 111, a bottom member 112, etc. to have a shape surrounding the mounting area A from the top, bottom, front, rear, and sides.

So as to allow the first rail 10 to easily slide to reciprocate in the front-rear direction of the second rail 20 in the state of being coupled to the second rail 20, a surface of the body portion 110 including the first shaped portion 120, the second shaped portion 130, the bottom member 112, etc., wherein the surface being brought into contact with the first rail 10, may be coated with a lubricant.

Because the body portion 110 is made of steel, when the body portion 110 slides while being in contact with the first rail 10 made of steel or aluminum, the body portion 110 may be worn down to thereby be damaged and deformed. For this reason, the surface of the body portion 110 may be coated with a lubricant, such as polytetrafluoroethylene (PTFE).

As illustrated in FIG. 8, the body portion 110 made of steel has a surface having formed thereon a lubricant layer 100*a* coated with a lubricant. The lubricant layer 100*a* may reduce the frictional force on the contact surface between the body portion 110 and the first rail 10, allowing easy sliding movement even with a relatively small force.

The first shaped portion 120 of the body portion 110 of the spring glide 100 of the present disclosure protrudes from an upper surface of the body portion 110 and is brought into contact with the first rail 10.

Here, the first shaped portion 120 is configured to dampen vibration in a first direction, the direction in which vibration is transmitted to the body portion 110, i.e., a vertical direction. So as to dampen the vertical vibration, the first shaped portion 120 is made of an elastic material and has an arch shape, and thus, when vibration occurs in the vertical direction, which is the first direction, the first shaped portion 120 may dampen the vibration by being selectively compressed.

Moreover, because the first shaped portion 120 has an elasticity and has an outwardly protruding arch shape to maintain the state of being brought into contact with the first rail 10, no gap is created between the upper surface of the body portion 110 and the first rail 10, preventing deterioration in perceived quality caused by vibration being transmitted to the driver due to a gap, which was a problem in the prior art.

The second shaped portion 130 of the body portion 110 of the spring glide 100 of the present disclosure protrudes from a side surface of the body portion 110 and is brought into contact with the first rail 10.

Here, the second shaped portion 130 is configured to dampen vibration in a second direction, the direction in which vibration is transmitted to the body portion 110, i.e., a lateral direction. So as to dampen the lateral vibration, the second shaped portion 130 is made of an elastic material and has an arch shape, and thus, when vibration occurs in the lateral direction, which is the second direction, the second shaped portion 130 may dampen the vibration by being selectively compressed.

As such, because the second shaped portion 130 has an elasticity and has an outwardly protruding arch shape to maintain the state of being brought into contact with the second rail 20, no gap is created between the side surface of the body portion 110 and the second rail 20.

In this embodiment, when vertical and lateral vibrations occur, the first shaped portion 120 and the second shaped portion 130 are compressed to dampen the vibration in the first and second directions. However, because vibrations in the vertical and lateral directions are complexly dampened by the first shaped portion 120 and the second shaped portion 130, vibration may also be dampened in a diagonal direction, which is a third direction.

Furthermore, the body portion 110 of the spring glide 100 according to an embodiment of the present disclosure includes the mounting members 111 and the bottom member 112.

The mounting members 111 of the spring glide 100 according to an embodiment of the present disclosure are selectively stretchable to correspond to the width of the mounting area A.

To this end, the mounting members 111 are formed at the front and the rear of the body portion 110, respectively, and have an elasticity. The mounting members 111 are selectively stretched outward to guide the body portion 110 to press-fit to the mounting area A.

Meanwhile, the mounting members 111 may include locking members 111*a*, respectively, which are bent from the body portion 110 and protruding to face each other to correspond to the shape of the mounting area A.

The mounting area A has formed therein locking grooves inclined in directions facing each other, and thus, when the body portion 110 is mounted to the mounting area A by stretching out the mounting members 111, the locking members 111*a* are each locked in a corresponding one of the locking grooves by the elastic restoring force generated by the elasticity of the mounting member 111, preventing the body portion 110 from being separated from the mounting area A in the sliding movement.

The bottom member 112 of the spring glide 100 according to an embodiment of the present disclosure is brought into contact with the first rail 10 while supporting the bottom surface of the mounting area A. Moreover, the bottom member 112 includes guide members 112*a* inclined at the front and the rear thereof to release contact from the first rail 10 in the length-wise direction.

The guide members 112*a* are inclined upward at the front and the rear of the bottom member 112, and thus, in the sliding movement, the lubricant oil is guided to smoothly move along the inclined surface of the guide member 112*a* to reach the contact surface between the bottom member 112 and the first rail 10, reducing the frictional force on the contact surface to thereby implement an apparatus in which a sliding movement is easily performed with a small force.

Moreover, the bottom member 112 may have formed therein a through hole 112*b* through which lubricant oil is discharged to the first rail 10.

Meanwhile, the damper 200 of the bearing assembly 1 according to an embodiment of the present disclosure is inserted into a groove 21 in the second rail 20 and is assembled to the internal surface of the spring glide 100. The damper 200 of the present disclosure is described in detail by referring to FIG. 4 through FIG. 6.

The damper 200 of the bearing assembly 1 according to an embodiment of the present disclosure is assembled to the internal surface of the spring glide 100 to prevent a problem in which the spring glide 100 is pressed to be deformed when a strong force is applied to the spring glide 100. Specifically, the damper 200 of the present disclosure may be made of an elastic material to absorb shock applied to the spring glide 100 and to disperse an instantaneous and strong force, and includes the main portion 210, a side extension 220, and a lower extension 230.

The main portion 210 of the damper 200 of the present disclosure is coupled to a mounting area A in the second rail 20, and is inserted into the groove 21 in the second rail 20. Moreover, the main portion 210 may have an area corresponding to that of the groove 21 in the second rail 20, and may protrude in a direction toward the groove 21 in the second rail 20 so as to be stably secured in the groove 21 in the second rail 20.

The side extension 220 of the damper 200 of the present disclosure protrudes from a side surface of the main portion 210. The side extension 220 protrudes toward the second shaped portion 130 of the spring glide 100 to prevent the second shaped portion 130 from being excessively pressed. Specifically, the side extension 220 serves to support the second shaped portion 130 of the spring glide 100 to absorb shock applied to the spring glide 100 and to prevent the spring glide 100 from being deformed by being excessively pressed when the first rail 10 slides with respect to the second rail 20.

The lower extension 230 of the damper 200 of the present disclosure may protrude from a lower end of the main portion 210 to prevent the spring glide 100 from being excessively pressed by the first rail 10. Specifically, when the first rail 10 slides, a strong force may be applied from the first rail 10, and the lower extension 230 of the present disclosure, protruding from the lower end of the damper 200, prevents the first shaped portion 120 from being pressed more than a predetermined amount.

Meanwhile, although the main portion 210 of the damper 200 is illustrated to have a flat surface and the side extension 220 and the lower extension 230 are illustrated to have a protruding shape in FIG. 5, the damper 200 may vary in shape when only the upper surface of the spring glide 100 or only the side surface of the spring glide 100 needs to be supported. As such, in the present disclosure, the main portion 210 may be inserted into the groove 21 in the second rail 20, and depending on an implementation, the main portion 210 may have a flat surface to be attached to the mounting area.

As such, the damper 200 is disposed inside the spring glide 100 of the present disclosure and the damper 200 is fixed in the groove 21 in the second rail 20, preventing the spring glide 100 from being pressed more than a predetermined amount when the first rail 10 slides with respect to the second rail 20. Moreover, even when the console is impacted, the damper 200 stably supports the spring glide 100, preventing excessive reduction in operating force and rigidity.

Meanwhile, FIG. 7 illustrates the assembled position of the spring glide 100 that changes depending on the dimensional difference between the rails. Referring to FIG. 7, when the manufacturing dispersion of the rail is excessive, the spring glide 100 may be assembled at different positions by adjusting the amount of area overlapping with the first rail (the console upper rail 10).

According to the present disclosure, the position where the spring glide 100 is assembled varies so that, when the first rail 10 and the second rail 20 are different in dimension due to the manufacturing dispersion, the position to assemble the spring glide 100 is changed to adjust the amount of area overlapping with the first rail 10 and to reduce disperse in the rigidity and operating force of the rail structure.

For example, as illustrated in FIG. 7, when the first rail 10 overlaps with the second rail 20, the assembled position of the spring glide 100 may be changed between position a through position c to compensate for the dimensional difference between the first rail 10 and the second rail 20. Meanwhile, although FIG. 7 illustrates that, assuming that the spring glide 100 overlaps with the first rail 10 by 0.3 mm, the overlapping amount between the spring glide 100 and the first rail 10 is adjusted to 0.2 mm when the spring glide 100 is assembled at positon b and the overlapping amount between the spring glide 100 and the first rail 10 is adjusted to 0.1 mm when the spring glide 100 is assembled at positon c, but the overlapping amounts are not limited thereto.

FIGS. 10A-10I are views illustrating various embodiments in shape of the spring glide 100 and the damper 200 of the bearing assembly for a vehicle according to an embodiment of the present disclosure.

Figure 10A:
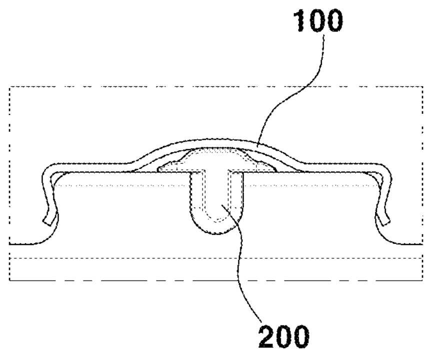
FIGS. 10A, 10B, 10C, 10D, 10E, 10F, 10G, 10H, and 10I are views illustrating various embodiments in shape of a spring glide and a damper of a bearing assembly for a vehicle according to an embodiment of the present disclosure.
Figure 10B:
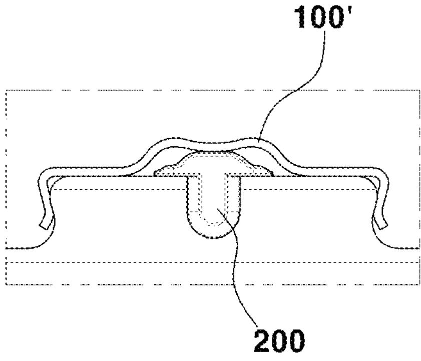
Figure 10C:
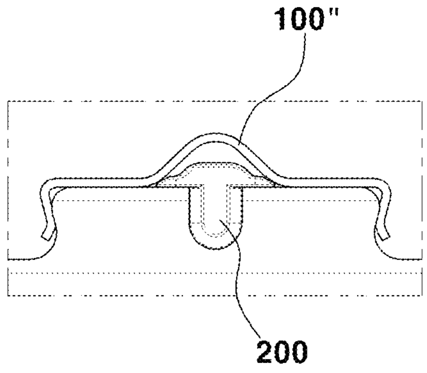
Figure 10D:
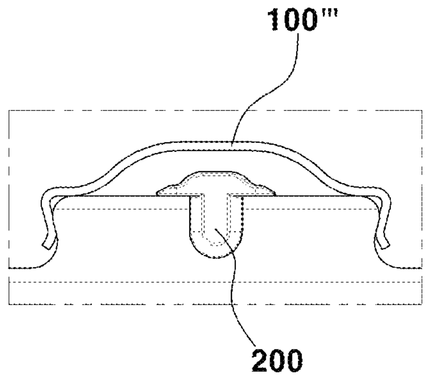
Figure 10E:
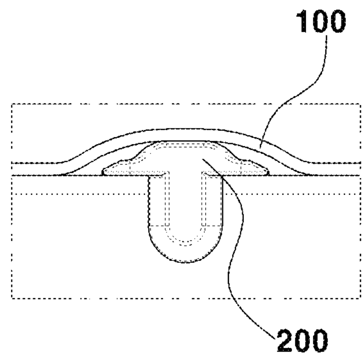
Figure 10F:
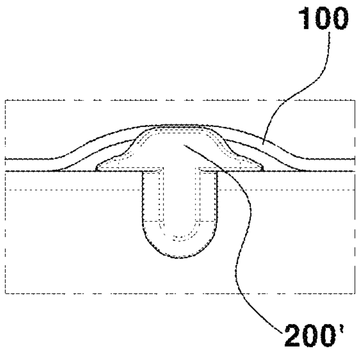
Figure 10G:
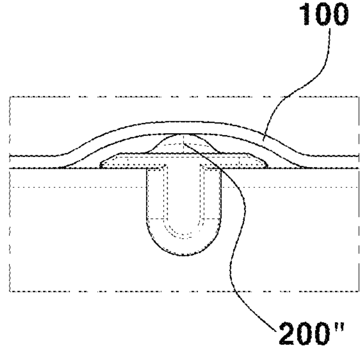
Figure 10H:
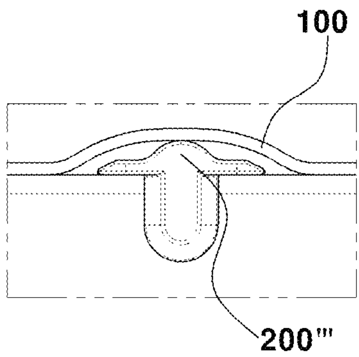
Figure 10I:
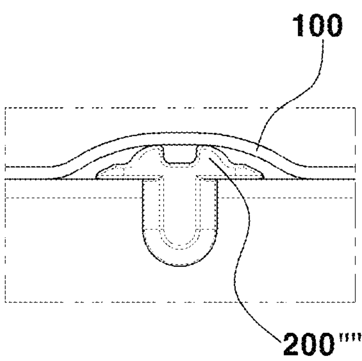

According to the present disclosure, there may be provided the spring glide 100 having one bump as in FIG. 10A, a spring glide 100' having two bumps as in FIG. 10B, a spring glide 100" extended in height as in FIG. 10C, and a spring glide 100'" having an extended area that covers the damper 200 as in FIG. 10D.

Furthermore, according to the present disclosure, the damper 200 may vary in shape. The contact area between the damper 200 and the spring glide 100 may be extended as in FIG. 10E, the length or height of a damper 200' may be extended to overlap with the spring glide 100 as in FIG. 10F, the area where the spring glide 100 and the damper 200" come into contact with each other may be limited to a predetermined area as in FIG. 10G, the spring glide 100 and a damper 200'" may be in line contact with each other as in FIG. 10H, and a damper 200"" having two bumps may come into contact with the spring glide 100 as in FIG. 10I. In the present disclosure, the damper 200 and the spring glide 100 may vary in shape as long as a corresponding embodiment has the technical feature of employing the damper to prevent the spring glide 100 from being pressed more than a predetermined amount by a force.

As is apparent from the above description, the present disclosure may obtain the following effects by the configuration, combination, and operation relationship described above with the present embodiment.

The present disclosure may provide an apparatus in which a spring glide is not deformed even though the spring glide is mounted to a rail.

Moreover, the present disclosure may provide an apparatus in which a spring glide is assembled at a position enabling a console to slide with smooth operation sensitivity, small operating force and high rigidity and complementing spring force.

Lastly, the present disclosure may provide an apparatus in which a spring does not need to be plastically deformed to match the size of a rail even when the dimensional difference between two rails is beyond a predetermined level.

The above detailed description is illustrative of the present disclosure. In addition, the above-described contents are to explain exemplary embodiments of the present disclosure, and the present disclosure can be used in other various combinations, changes, and environments. That is, the present disclosure may be changed or modified within the scope of the concept of the present specification, an equivalent scope to the present disclosure, and/or the scope of technology or knowledge in the art. The embodiments are illustrative of a best state for implementing a technical spirit of the present disclosure, and various modifications required in a detailed application field and purpose of the present disclosure are possible. Thus, the above detailed description of the present disclosure is not to be construed as limited to the specific embodiments disclosed herein. Also, the attached claims should be interpreted to include other embodiments.

The invention claimed is:

1. A bearing assembly for a vehicle in a rail structure in which two rails slide by being rail-coupled to each other, wherein the two rails, either of which having a mounting area, comprise a first rail and a second rail, the first rail being configured to slide along the second rail, the bearing assembly comprising:

a spring glide mounted to the mounting area and configured to dampen vibration transmitted from either the first rail or the second rail by including a body portion mounted to the mounting area, and at least one shaped portion protruding from the body portion and configured to contact the first rail; and a damper assembled to an internal surface of the spring glide and configured to prevent deformation of the spring glide;

wherein the second rail includes at least one groove in a lengthwise direction of the second rail; and wherein the damper comprises a main portion inserted into the at least one groove.

2. The bearing assembly of claim 1, wherein the damper is made of an elastic material.

3. The bearing assembly of claim 1, wherein the damper comprises:

a main portion mounted to the mounting area;

a side extension protruding from a side surface of the main portion; and a lower extension protruding from a lower end of the main portion.

4. The bearing assembly of claim 1, wherein the second rail includes at least one groove in a length-wise direction of the second rail, and the damper is inserted into the at least one groove.

5. The bearing assembly of claim 1, wherein the spring glide comprises:

a body portion mounted to the mounting area;

a first shaped portion protruding from an upper surface of the body portion and brought into contact with the first rail to dampen vibration in a first direction transmitted to the body portion; and a second shaped portion protruding from a side surface of the body portion and brought into contact with the first rail to dampen vibration in a second direction transmitted to the body portion.

6. The bearing assembly of claim 5, wherein the body portion, comprising the first shaped portion and the second shaped portion, has a surface configured to contact the first rail, wherein the surface is coated with a lubricant.

7. The bearing assembly of claim 5, wherein the first shaped portion is made of an elastic material and has an arch shape and configured to be compressed when vibration occurs in a vertical direction.

8. The bearing assembly of claim 5, wherein the second shaped portion is made of an elastic material and has an arch shape and configured to be compressed when vibration occurs in a lateral direction.

9. The bearing assembly of claim 5, wherein the body portion comprises:

a plurality of mounting members stretchable to correspond to a width of the mounting area; and a bottom member configured to support a bottom surface of the mounting area and to contact the second rail.

10. The bearing assembly of claim 9, wherein the plurality of mounting members have an elasticity, and are stretched outward to guide the body portion to press-fit to the mounting area.

11. The bearing assembly of claim 9, wherein the plurality of mounting members each comprise locking members which are bent from the body portion and protrude to face each other to correspond to a shape of the mounting area.

12. The bearing assembly of claim 9, wherein the bottom member comprises an inclined surface at a front end of the bottom member and an inclined surface at a rear end of the bottom member, the inclined surfaces being inclined upward with respect to a bottom surface of the bottom member.

13. The bearing assembly of claim 9, wherein the bottom member includes a through hole configured to allow lubricant oil to move there through to the first rail, wherein the lubricant oil is discharged through the through hole to a contact surface between the bottom member and the first rail when the first rail slides with respect to the body portion.

14. The bearing assembly of claim 5, wherein the the first shaped portion is integrated with an upper surface of the body portion and the second shaped portion is integrated with a side surface of the body portion, and either one of or both of the first shaped portion and the second shaped portion is coupled to the mounting area provided in the second rail in a length-wise direction.

15. The bearing assembly of claim 1, wherein the rail structure is any one of a seat rail, a table rail, and an armrest rail.

* * * * *